(12) United States Patent
Shi et al.

(10) Patent No.: US 7,051,028 B2
(45) Date of Patent: May 23, 2006

(54) CONCURRENCY CONTROL IN HIGH PERFORMANCE DATABASE SYSTEMS

(75) Inventors: Victor T. Shi, Fargo, ND (US);
William K. Perrizo, Fargo, ND (US)

(73) Assignee: NDSU-Research Foundation, Fargo, ND (US)

( * ) Notice: Subject to any disclaimer, the term of this patent is extended or adjusted under 35 U.S.C. 154(b) by 277 days.

(21) Appl. No.: 10/001,193

(22) Filed: Nov. 15, 2001

(65) Prior Publication Data
US 2002/0091717 A1     Jul. 11, 2002

Related U.S. Application Data
(60) Provisional application No. 60/249,084, filed on Nov. 15, 2000.

(51) Int. Cl.
*G06F 17/30* (2006.01)
(52) U.S. Cl. .............................. 707/9; 707/3
(58) Field of Classification Search .............. 707/1–10, 707/100–104.1, 200–205
See application file for complete search history.

(56) References Cited

U.S. PATENT DOCUMENTS

| | | | |
|---|---|---|---|
| 6,052,695 A * | 4/2000 | Abe et al. | 707/202 |
| 2003/0236786 A1* | 12/2003 | Shi et al. | 707/8 |

OTHER PUBLICATIONS

Thomasian, Alexander, "Distributed optimistic concurrency control methods for high-performance transaction processing", Jan.-Feb. 1998, IBM, NY, USA, pp. 173-189.*

Dias et al, "Integrated concurrency-coherency controls for multisystem data sharing", SE, IEEE Transactions, Apr. 1989, NY, USA, pp. 437-448.*

Jenq et al, "A queueing network model for a distributed database tested", SE, IEEE Transactions, MA, USA, pp. 908-921.*

"*Mining Association Rules Between Sets of Items in Large Database*," R. Agrawal, T. Imielinski, A. Swami, ACM-SIGMOD 93, Washington, D.C., pp. 207-216, May 1993.

"*Fast Algorithms for Mining Association Rules,*" R. Agrawal, R. Srikant, Proceedings of the International Conference on VLDB, Santiago, Chile, 13 pgs., Sep. 1994.

(Continued)

*Primary Examiner*—Mohammad Ali
(74) *Attorney, Agent, or Firm*—Patterson, Thuente, Skaar & Christensen, P.A.

(57) ABSTRACT

A system and method for concurrency control in high performance database systems. Generally includes receiving a database access request message from a transaction. Then, generating an element that corresponds to the access request message. The element type is that of a read element, commit element, validated element, or restart element. The element is then posted to a read-commit (RC) queue. If the element is a commit element, an intervening validation of the transaction is performed. Upon the transaction passing validation the requested database access is performed.

12 Claims, 9 Drawing Sheets

CLIENT-SIDE PROCEDURE

```
Initiate a transaction, set more-operations_needed=1;
While (more_operations_needed)
{    Send a message containing the read/write request set to the database site.
     Wait for the values of requested data items from the database site.
     If (received all the requested data and no new read/write operations to request)
        more_operations_needed=0;
}
If   (the client wants to commit)
     Send a commit request message to the database site.
Else
{    send an abort message if the client wants to abort;
     Transaction ends;
     Release all resources used by the transaction;
}
Wait for acknowledgement message from the database site.
{    If   (a success message received)
     {    The transaction has committed;
          All resources used by the transaction can be released;
          Transaction ends;
          Release all resources used by the transaction;
     }
     Else
     {    The values of read received are from a restart message;
          Re-calculate the values for writes based on the newly received values;
          If  (the client decides to restart the transaction)
              Send a restart message with the new writes to the database sites
          Else
              Send an abort to the database site instead of the restart message
     }
}
```

OTHER PUBLICATIONS

"Mining Quantitative Association Rules in Large Relational Tables," R. Srikant, R. Agrawal, ACM-SIGMOND 96, Montreal, Canada, pp. 1-12, Jun. 1996.

"An Effective Hash-Based Algorithm for Mining Association Rules," J.S. Park, M.S. Chen, P.S. Yu, ACM-SIGMOD 95, California, pp. 175-186, 1995.

"Multidimensional Access Methods," V. Gaede, O. Gunther, ACM Computing Surveys, vol. 30, No. 2, pp. 171-231, Jun. 1998.

"The Quadtree and Related Hierarchical Data Structure," H. Samet, ACM Computing Survey, vol. 16, No. 2, pp. 188-260, Jun. 1984.

"Quad Trees: A Data Structure for Retrieval of Composite Keys," R.A. Finkel, J.L. Bentley, Acta Informatica, vol. 4, pp. 1-9, 1974.

Web site print-out: "What are HH-codes and how can they be used to store hydrographic date?," H. Iverson, Norwegian Hydorgraphic Service (NHS), http://www.statkart.no/nlhdb/iveher/hhtext.htm, 7 pgs., Jan. 1998.

"Run-Length Encodings," S.W. Golomb, IEEE Trans. On Information Theory, vol. 12, No. 3, pp. 399-401, Jul. 1966.

"Mining Frequent Patterns Without Candidate Generation," J. Han. J. Pei, Y. Yin, ACM-SIGMOD 2000, Dallas, Texas, pp. 1-12, May 2000.

"Spatial Data Mining: A Database Approach," M. Ester, H-P. Kriegel, J. Sander, Proceedings of the Fifth International Symposium on Large Spatial Databases (SSD), Berlin, Germany, 20 pgs., 1997.

"Spatial Data Mining: Progress and Challenges Survey Paper," K. Koperski, J. Adhikary, J. Han, Data Mining and Knowledge Discovery, 16 pgs., 1996.

"Spatial Data Mining: Database Primitives, Algorithms and Efficient DBMS Support," M. Ester, A. Frommelt, H-P. Kriegel, J. Sander, Data Mining and Knowledge Discovery, 28 pgs., 1999.

"Discovery of Spatial Association Rules in Geographic Information Databases," K. Koperski, J. Han, SSD, 20 pgs., 1995.

Web site print-out: SMILEY (Spatial Miner & Interface Language for Earth Yield), Database Systems Users & Research Group at NDSU (DataSURG) http://www.midas.cs.ndsu.nodak.edu/~smiley, 5 pgs., undated.

"The Application of Association Rule Mining on Remotely Sensed Data," J. Dong, W. Perrizo, Q. Ding, J. Zhou, Proceedings of ACM Symposium on Applied Computers, Italy, 6 pgs., Mar. 2000.

"Brute-Force Mining of High-Confidence Classification Rules," R.J. Bayardo, Jr., Knowledge Discovery & Data Mining, pp. 123-126, 1997.

"Finding Interesting Associations Without Support Pruning," E. Cohen, M. Datar, S. Fujiwara, A. Gionis, P. Indyk, R. Motwani, J. Ullman, C. Yang, Proceedings of 26th International Conference on Very Large Data Bases, Cairo, Egypt, 12 pgs., Sep. 2000.

"Growing Decision Trees on Support-Less Association Rules," K. Wang S. Zhou, Y. He, 6$^{th}$ ACM SIGKDD International Conference on Knowledge Discovery & Data Mining, Boston, Massachusetts, 5 pgs., Aug. 2000.

"Integrating Classification and Association Rule Mining," B. Liu, W. Hsu, Y. Ma, The Fourth International Conference on Knowledge Discovery and Data Mining, New York, New York, 7 pgs., Aug. 1998.

"Inferring Decision Trees Using the Minimum Description Length Principle," J.R. Quinlan, R.L. Rivest, Information and Computation, Academic Press, Inc., vol. 80, pp. 227-248, 1989.

"An Interval Classifier for Database Mining Applications," R. Agrawal, S. Ghosh, T. Imielinski, B. Iyer, A. Swami, 18th International Conference on Very Large Data Bases, Vancouver, Canada, 14 pgs., Aug. 1992.

"SPRINT: A Scalable Parallel Classifier for Data Mining," J. Shafer, R. Agrawal, M. Mehta, 22nd International Conference on Very Large Data Bases, Bombay, India, pp. 544-555, Sep. 1996.

"Fast Approach for Association Rule Mining for Remotely Sensed Imagery," Q. Zhou, Q. Ding, W. Perrizo, Proceedings of the ISCA International Conference on Computers and Their Applications, New Orleans, Louisiana, 4 pgs., Mar. 2000.

"Automatic Subspace Clustering of High Dimensional Data for Data Mining Application," R. Agrawal, J. Cehrke, D. Gunopulos, P. Raghavan, Proceedings of ACM SIGMOD International Conference on Management of Data, Seattle, Washington, 12 pgs., Jun. 1998.

"Efficient and Effective Clustering Method for Spatial Data Mining," R. Ng, J. Han, Proceedings of the 20th International Conference on Very Large Data Bases, Santiago, Chile, 12 pgs., Sep. 1994.

"Constraint-Based Clustering in Large Databases," A.K.H. Tung, J. Han, L.V.S. Lakshmanan, R.T. Ng, The 8th International Conference on Database Theory, London, United Kingdom, 15 pgs., Jan. 2001.

"Data Mining: An Overview from a Database Perspective," M.S. Chen, J. Han, P.S. Yu, IEEE Transactions on Knowledge and Data Engineering, vol. 8, No. 6, pp. 1-40, Dec. 1996.

William Perrizo, "Request Order Linked List (ROLL): A Concurrency Control Object", Proceedings of IEEE International Conference on Data Engineering, Apr. 11, 1991, Kobe, Japan, pp. 278-285.

William Perrizo, Joseph Rajkumar, and Prabhu Ram, "HYDRO: A Heterogeneous Distributed Database System", ACM Conference on Management of Data (SIGMOD), Denver, CO, May, 1991, pp. 32-39.

William Perrizo, Lester I. McCann, Joseph Rajkumar, and Prabhu Ram, "Transaction Management in HYDRO: A Multi-database System", IEEE-IPSJ MDBS-RIDE Workshop, Kyoto, Japan, Apr., 1991, pp. 279-279.

William Perrizo and Donald A. Varvel, "Some Alternative Algorithms to the Standard Locking Algorithm in Database Systems", IEEE-ACM System Sci. Conf.; Honolulu, HI; Jan., 1986, pp. 633-642.

William Perrizo and Donald A. Varvel, "Efficient Computation of Optimal Transaction Processing in a Database System", Computer Software and Applications, Chicago, IL; Oct., 1985, pp. 152-155.

William Perrizo, Min Luo, and Donald A. Varvel, "Ordering Accesses to Improve Transaction Processing Performance", IEEE Conference on Data Engineering, Los Angeles, CA, Feb. 4, 1988, pp. 58-63.

William Perrizo and Russell Richter, "Concurrency Control Using an Extended Query Language", Conference on Supercomputing, Santa Clara, CA, Apr. 30-May 5, 1989, pp. 436-442.

William Perrizo, "Distributed Window Request Order Linked List (DW-ROLL): Concurrency Control for Distributed and Multi-databases", Computer Applications in Industry and Engineering, Honolulu, Dec., 1993, pp. 223-227.

Hossein Hakimzadeh, William Perrizo, Prabhu Ram, Igor Tatorinov, and Duane Noraker, "Using Datacycle for Concurrency Control in a Distributed Database", Conference on Computer Applications in Industry & Eng., Nov. 11, 1998, Las Vegas, pp. 80-83.

Victor T.S. Shi and William Perrizo, "Read-Commit Order for Concurrency Control in Centralized High Performance Database Systems", Information: An International Journal, V7:1, pp. 95-106, 2004, pp. 95-105.

Weili Yao and William Perrizo, "An Improved Algorithm for Concurrency Control in Distributed Database Systems", Information Science Journal, vol. 103:1-4, pp. 23-26, 1997, pp. 23-36.

William Perrizo and Igor Tatarinov, "A Semi-Optimistic Database Schedular Based on Commit Ordering", 1998 Int'l Conference on Computer Applications in Industry and Engineering, Nov. 11, 1998, Las Vegas, pp. 75-79.

Qinghua Zou, William Perrizo and Qin Ding, "Level Order Transaction Scheduling—High Peformance Concurrency Control in Centralized Databases", ISCA International Conference on Computer and Their Applications, New Orleans, Mar., 2000, pp. 88-91.

Tanya Jane Harris, William Perrizo and Qin Ding, "Multiversion Post Ordering: A New Concurrency Control Method", Int'l Conference on Computer Applications in Industry and Engineering, Honolulu, Nov., 2000, pp. 9-12.

Daojing Lu, Qinghua Zou, and William Perrizo, "A Dual Copy Method for Transaction Separation with Multiversion Control for Read-only Transactions", ACM Symposium on Applied Computing, Mar., 2001, Las Vegas, NV, pp. 290-294.

Victor T.S. Shi and William Perrizo, "A New Method for Concurrency Control in High Performance Database, Systems", ISCA Computers And Their Applications Conference—Apr., 2002, pp. 184-187.

* cited by examiner

INTERVENING VALIDATION PROCEDURE

Conflict =0; "First" = NULL; "Second" = NULL; Success = 1;
Search the RC-queue for the transaction's first read element in the queue;
If    (Such is a read element is not found)
        Return Validated = success;
"First" = the first reached read element;
While (1)
{       Compare "First" with all the elements of other transactions behind it
        until it reaches an element of the same transaction;
       If    (There is no element conflict)
       {    Add the "First" element to the reached element of the same transaction;
        Remove the "First" Element from the RC-queue;
        If    (The reached element is the commit element)
            Return Validated = success;
        "First" = the reached element;
       }
       Else
       {    Insert "First" into the RC-queue right before the conflicting element;
        Remove the original "First" from the RC-queue;
        Conflict = 1;
        "Second" = commit element;
        While (1)
        {    Compare "Second" with all the elements of other transactions before it
        until it reaches an element of the same transaction;
            If    (There is no element conflict)
            {    Add the "Second" element to the reached element of the same
                transaction;
                Remove the "Second" element from the RC queue;
                If    (The reached element is the "First")
                      Return Validated = success;
                "Second" = the reached element;
            }
            Else
            {    If    (Conflict = 1)
                {    Remove all elements of the transaction from the RC queue
                Return validated = failure;
                }
            }
        }
       }
}

FIG. 3

CLIENT-SIDE PROCEDURE

Initiate a transaction, set more-operations_needed=1;
While (more_operations_needed)
    {      Send a message containing the read/write request set to the database site.
           Wait for the values of requested data items from the database site.
           If (received all the requested data and no new read/write operations to request)
               more_operations_needed=0;
    }
If     (the client wants to commit)
        Send a commit request message to the database site.
Else
{      send an abort message if the client wants to abort;
      Transaction ends;
      Release all resources used by the transaction;
}
Wait for acknowledgement message from the database site.
{      If    (a success message received)
          {      The transaction has committed;
               All resources used by the transaction can be released;
               Transaction ends;
               Release all resources used by the transaction;
          }
          Else
          {      The values of read received are from a restart message;
               Re-calculate the values for writes based on the newly received values;
               If    (the client decides to restart the transaction)
                      Send a restart message with the new writes to the database sites
               Else
                      Send an abort to the database site instead of the restart message
          }
}

FIG. 4

SERVER-SIDE SCHEDULER PROCEDURE

Wait for the messages from clients
{    If    (an access request message arrives)
        {    Generate a read element;
            Fill in its fields with the information in the message;
            Post the read element to the RC-queue;
            Deliver the access request message to the execution queue;
        }
    Else if (a commit request message arrives)
        {    Generate a commit element and post it to the RC-queue;
            Invoke the Intervening Validation Procedure;
            If    (validation passes)
            {    Deliver the commit request message to the execution queue;
            }
            Else
            {    Remove all the element of the transaction from the RC-queue;
                If    (the transaction has the access invariance property)
                {    Generate a restart element and post it to the RC-queue;
                    Deliver a restart request message to the data manager;
                    Send a restart message with the new values of read to the client
                    and wait for its answer;
                }
            }
    }
    Else if (a request message with updates received from the client)
        {    Send updates to the data manager;
        }
    Else if (commit success messages received from the data manager)
        {    Transfer the message to the client;
            Mark the element of the validated transaction in the RC-queue as validated (i.e.,
            set the validated bit to 1) if there is one or more uncommitted transacations before
            it in the RC-queue or remove all elements of the committed transactions from the
            RC-queue if no uncommitted transactions are before it;
            Release other resources used by the committed transaction
        }
    Else    (an abort message is received)
        {    Remove all the elements of the transaction from the RC-queue;
            Release all resources used by the transaction;
        }
}

FIG. 5

SERVER-SIDE DATA MANAGER PROCEDURE

While (1)
{      Retrieve messages from the execution queue;
        If    (the message is an access message)
        {      If    (the requested data items are write-locked)
                    Wait until the locks are released;
            Set read locks to the data items to read;
            Perform read operations;
            Release the read locks;
            Hold write operations;
        }
        If    (validation success message is received)
        {      If    (the data items are locked)
                    Wait until the locks are released;
            Set write locks on the data items to write;
            Perform the write operations;
            Release the write locks;
            Send commit success message to the scheduler after finishing execution of each transaction;
            Release all resources used by the committed transaction;
        }
}

FIG. 6

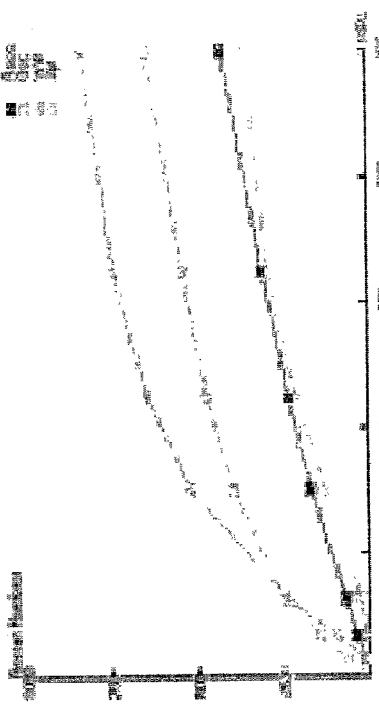
Fig 9B Restarts (transaction size=10-16)
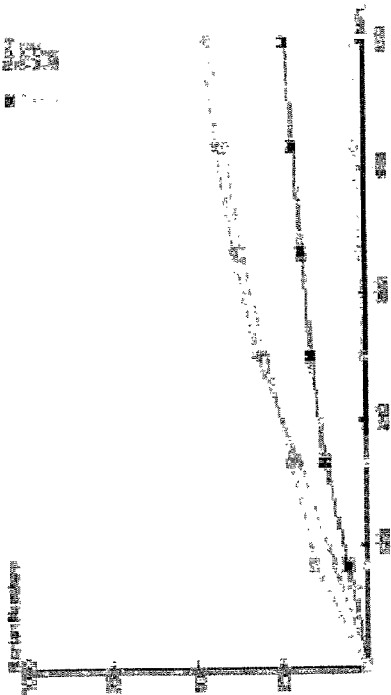
Fig 9D Restarts (transaction size=4-6)
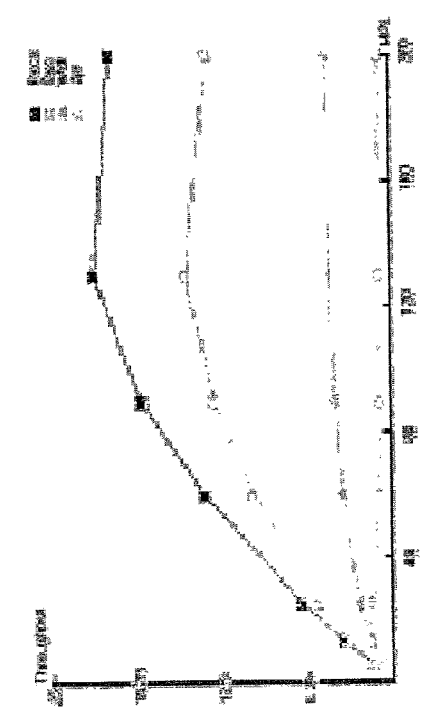
Fig 9A Throughput (transaction size=10-16)
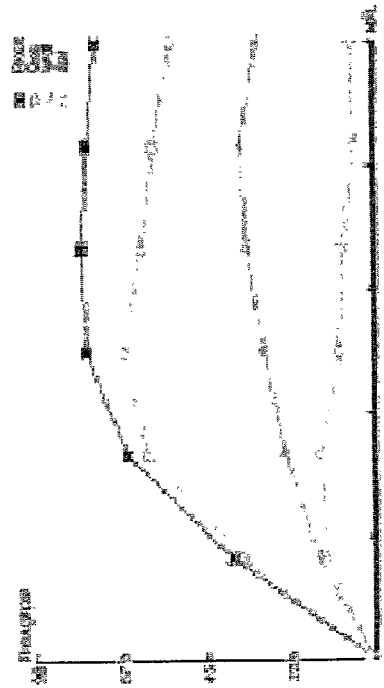
Fig 9C Throughput (transaction size=4-6)

CONCURRENCY CONTROL IN HIGH PERFORMANCE DATABASE SYSTEMS

CLAIM TO PRIORITY

The present application claims priority to U.S. Provisional Patent Application No. 60/249,084, filed Nov. 15, 2000, and entitled "Read-Commit Concurrency Control System and Method." The identified provisional patent application is hereby incorporated by reference in its entirety.

GOVERNMENT RIGHTS

The present invention was made with government support under Grant No. DAAH04-96-1-0329, awarded by the U.S. Army Research Office and Grant No. OSR-9553368, awarded by the National Science Foundation HER/EPSCoR. The U.S. Government retains certain rights to the present invention.

FIELD OF THE INVENTION

The present invention relates to concurrency control in computerized database systems and, more particularly, to a read-commit order concurrency method, based on optimistic mechanisms, that is deadlock free.

BACKGROUND OF THE INVENTION

In recent years the Internet has grown so fast that E-businesses are becoming highly profitable. Internet database systems provide business information from which an unprecedented number of customers may access. With the drastic growth of Internet users, the demand for higher system throughput becomes urgent. Replicated database systems have attracted considerable attention due to their apparent advantages of improved data availability and system scalability. In a replicated database system, identical copies of data objects are kept in multiple geographically distributed sites to provide nearby customers with fast and easy accesses. The multiple copies of data objects also provide a much more reliable information service against system outages, which might otherwise cause severe losses in E-businesses such as online stock trading systems. However, while the replication paradigm brings the benefit of quick response to read-only operations, it does cause new problems—the workload of updates in each site increases proportionally to the number of replicas of data objects. It has been discussed that the deadlock rate has a cubic growth versus the number of replicas. This implicates that two phase locking, the most commonly used locking-based concurrency control method, cannot meet the increasing needs of high performance in today's Internet database systems such as online shopping systems, stock trading systems, etc.

The relative performance of three different approaches for concurrency control, i.e., blocking-based, immediate-restart, and optimistic, under a variety of modeling assumptions have been studied. In the blocking-based approach, transactions set read locks on objects that they read, then upgrade the read locks to write locks for the objects that they also write. When a lock request is denied, the requesting transaction is blocked. Wait-for-graph is used for deadlock detection. In the immediate-restart approach, transactions lock the objects in the same way as in the blocking-based approach, but they are aborted immediately when a lock request is denied. In the optimistic approach, transactions are allowed to be executed unhindered and are validated only after they have reached their commit points, but they are restarted if any object they read has been written by other committed transactions. The conclusion is that a concurrency control method that tends to conserve physical resources by blocking transactions, such as S2PL, out performs immediate-restart and optimistic methods for medium to high levels of resource utilization. In an environment of sufficient resources of CPUs and disks, an optimistic method is a better choice in terms both system throughput and transaction response time.

With the fast progress of technologies, the available resources may no longer be a bottleneck, e.g., CPU speed increases drastically and the costs of disks and CPUs are dropping quickly. Thus, optimistic approaches seem more promising than ever. It has been proposed that a hybrid two-phase concurrency control method be used wherein, in the first execution phase an optimistic concurrency control method is used, and in the restart phase a conservative 2PL is used. With such a method, it was found that, statistically, transactions intend to access the same dataset as before, if they are restarted due to access conflicts. With the access invariance property, this method ensures, at most, one transaction re-execution. This eliminates the repeated restart problems in optimistic concurrency control methods and makes transaction response time more predictable.

SUMMARY OF THE INVENTION

The disadvantages and limitations of the prior art are, at least in part, overcome by the concurrency control system and method of the present invention.

The present invention provides a method for concurrency control in high performance database systems. The method generally includes receiving a database access request message from a transaction. Then, generating an element that corresponds to the access request message. The element type is that of a read element, commit element, validated element, or restart element. The element is then posted to a read-commit (RC) queue. If the element is a commit element, an intervening validation of the transaction is performed. Upon the transaction passing validation the requested database access is performed.

The system of the present invention provides for a client-server environment wherein the client produces a transaction that incorporates the database access request message. The server includes a scheduler and a data manager. The scheduler operates to generate an element corresponding to the database access request message, post it to the RC-queue, and perform an intervening validation of the transaction upon the posting of a commit element. The data manager performs the requested database access upon the transaction passing intervening validation.

Within the system and method of the present invention, the generated element is always posted to the bottom of the RC-queue. Further, the intervening validation generally comprises failing the validation of a transaction when the transaction has at least two elements that are in conflict with intervening elements of another transaction and passing the validation of a transaction when the transaction has only one element that conflicts with intervening elements of another transaction. The intervening validation ensures that a validated transaction is represented by only one element in the RC-queue. The requested database access performed by the system and method is performed in the same order as the postings to the RC-queue.

BRIEF DESCRIPTION OF THE DRAWINGS

FIG. 3 is a pseudo-code listing of the intervening validation technique that is used by the concurrency control system and method of the present invention.

FIG. 4 is a pseudo-code listing of the client-side procedure of the concurrency control system and method of the present invention.

FIG. 5 is a pseudo-code listing of the server-side scheduler procedure of the concurrency control system and method of the present invention.

FIG. 6 is a pseudo-code listing of the server-side data manager procedure of the concurrency control system and method of the present invention.

FIGS. 9A–9D are comparison graphs of throughput and restarts for the concurrency control system and method of the present invention against the prior art methods of 2PL, OCC and WDL in a client-server environment.

DETAILED DESCRIPTION OF THE PREFERRED EMBODIMENTS

The present invention comprises a system and method for concurrency control in centralized high performance database systems. The concurrency control system 10 and method of the present invention uses several techniques to reduce restarts and improve performance in terms of system throughput and transaction response time. Specifically, a centralized data structure, i.e., a Read-commit queue (RC-queue), is used to record the execution order of transactions. Four types of elements are defined in the RC-queue for the convenience of transaction validation and include: 1. Read element; 2. Commit element; 3. Restart element; and 4. Validated element. New elements are en-queued to the rear of the RC-queue and validated elements are removed from the front of the RC-queue. An intervening validation technique used by the concurrency control system of the present invention utilizes element conflict instead of operation conflict to reduce validation failures. In contrast to traditional order, concurrency control schemes, which abort transactions when conflicts occur, the concurrency control scheme of the present invention only aborts transactions when two or more intervening conflicts occur. This scheme significantly reduces restarts to virtually the same level as 2PL (two phase locking) systems. Transactions can be controlled to complete successfully at any execution phase by using an over-declaration technique or an access invariance property.

Figure 1:
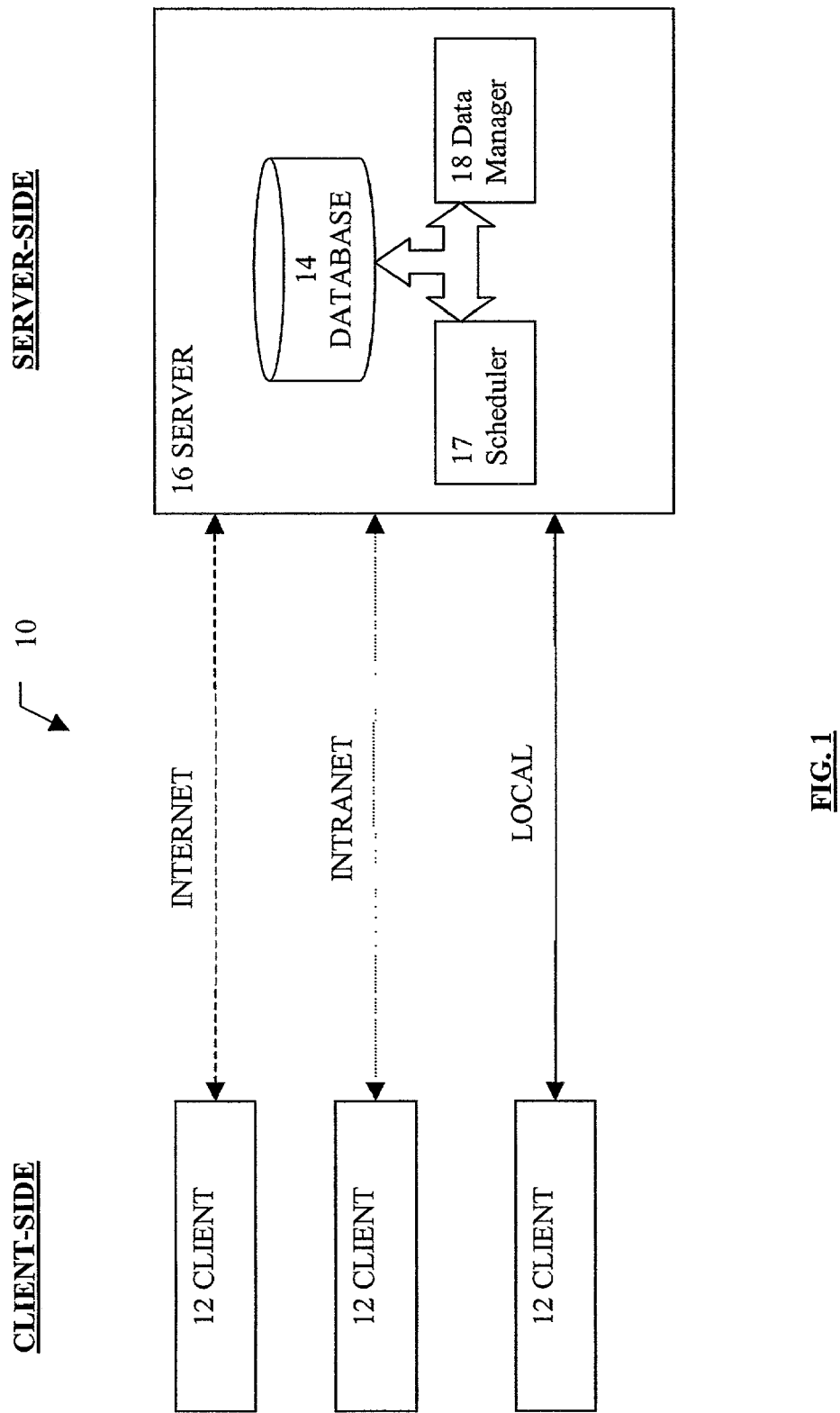
FIG. 1 is a block diagram of a centralized database system incorporating the present invention.

The concurrency control system 10 and method of the present invention is described with reference to a client-server database system, a block diagram of which is provided in FIG. 1. In this system, clients 12 may access the database 14 of a server 16 locally or through the Internet. The server 16 additionally includes a database scheduler 17 and a database data manager 18. In particular, the present invention is described in reference to a centralized single site system, however, it should be noted that the present invention may be easily extended to a replicated database system over a wide area network without departing from the spirit or scope of the invention.

In the centralized single site system, a high throughput and low response time are desired, and locking-based concurrency control methods such as 2PL no longer fit the definition due to the enormous number of users and uncertain network delay, which increases the "intratransaction think time." It is assumed that a transaction may send multiple data access requests to the system, each of which contains one or more access operations. When the system 10 receives a request message from a client 12, it generates a corresponding element 19 and posts it to an RC-queue 20 (see FIG. 2), which is used to validate transactions when they enter the commit phase. An element 19 in the RC-queue 20 contains the identifiers of the transaction, the data items to be accessed, and other information.

Figure 2:
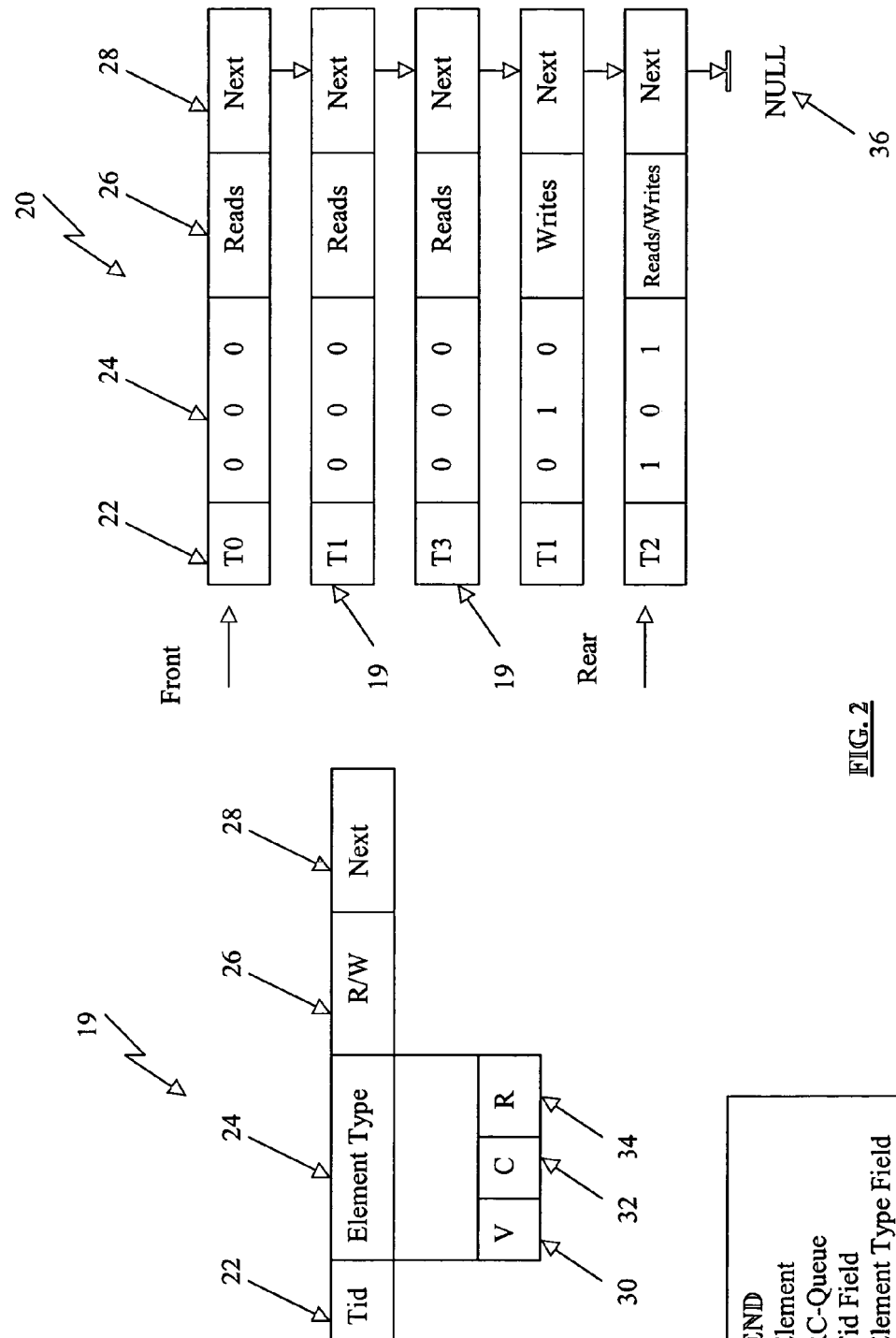
FIG. 2 is an example of a centralized data structure, i.e., an RC-queue, used by the concurrency control system and method of the present invention.

An example of an RC-queue 20 is shown in FIG. 2. As indicated above, the elements 19 in the queue 20 are divided into four types: a read element, a commit element, a validated element, and a restart element. A read element represents the read/write request message a transaction submits. A commit element represents a commit request message. A transaction may own multiple read elements in the RC-queue since it may submit multiple requests. Note that a read element only contains the identifiers of data items requested to read. All the data items that the transaction requests to write are contained in the commit element because a deferred write technique is used to avoid cascading abort. The data manager 18 performs data accesses in the same order as they appear in the RC-queue 20. In this way, the element 19 order in the RC-queue 20 represents the real execution order of data accesses that the system 10 performs, and can be used for transaction validation. When the validation of a transaction execution fails, and the client 12 intends to access the same data set (e.g., access invariance property), then the system 10 generates a restart element.

The restart element contains all the identifiers of data items and the operations that the failed transaction intended to perform. If the client 12 intends to access a completely new data set after a validation failure, then the system 10 preferably aborts the failed transaction and treats an access request from the client 12 as if they were from a newly arrived transaction. Validated elements correspond to transactions that have been validated, or transactions that do not need validation. When a validated element represents a transaction that does not need validation, it contains all the access requests of that transaction.

FIG. 2 also shows the format of elements 19 in the RC-queue 20. An element 19 comprises four fields: Tid field 22, element type field 24, access field 26, and next pointer field 28. The Tid field 22 provides the identifier of the transaction. The access field 26 holds the read/write set that the message requests to read/write. The element type field 24 comprises three (3) bits: V 30, C 32, and R 34. The V bit 30 is set to one (1) when the element 19 is a validated element corresponding to a transaction that does not need validation, or when the transaction has passed validation. The C bit 32 is set to one (1) if the element 19 is a Commit element, indicating the corresponding request message is a commit request message. The R bit 34 is set to one (1) if the element 19 is a restart element, indicating the transaction is a restart transaction and has the access invariance property. The access invariance property indicating that the transaction will access the same data items as it did in the first execution. The next pointer field 28 includes a pointer that is set to point to the next element 19 in the queue 20. The pointer of the last arrived element 19 is set to null 36, as shown, because no transaction arrives after it. In this instance, a linked list is used to represent the RC-queue 20 for simplicity. The front element 19 is removed from the queue 20 if it is a validated element. New elements 19 enter the queue 20 as the rear-most element 19 in the queue 20. Alternatively, doubly linked lists may be used to speed up the validation process. In the example of FIG. 2, transactions T0 and T3 each own one read element, T1 owns one read element and one commit element, and T2 owns one restart element. In the restart element of T2, the validated bit 30 is set to one (1), indicating that T2 needs no further validation.

Intervening Validation Technique

To employ the RC-queue 20, the concurrency control system and method of the present invention utilizes an intervening validation technique. It is has been named "intervening" because the validation only checks the elements 19 of the transaction to be validated and the intervening element from other transactions in the RC-queue 20 for validation. In this technique the concept of element conflict is used to determine whether or not a transaction can be validated. For purposes of the present invention, an element 19 is deemed to conflict with another element 19 if any of the operations they contain are in conflict. Pseudo-code detailing the operation of the intervening validation technique is provided in FIG. 3.

A validation technique is critical to an optimistic concurrency control method. The intervening validation technique of the present invention uses the RC (read-commit) structure to achieve desired properties such as low restart rates, high system throughput, short and predictable transaction response time, etc. With the concurrency control system and method of the present invention, the system scheduler 17 maintains the RC structure. When a commit request message arrives, the scheduler 17 generates a commit element, i.e., an element with C bit 32=1, and posts it to the RC-queue 20, then the validation process starts.

Per the pseudo-code of FIG. 3, the process traverses the queue 20 from the commit element upward until it reaches the first read element of the same transaction. To further understand, let "first" be the first element encountered. The intervening validation technique checks if "first" conflicts with the intervening elements. The "first" element's intervening elements are the elements of other transactions between the "first" element and the element of the same transaction after it. If "first" does not conflict with the intervening elements, then the first read element and the element of the same transaction right after it are combined. The combined element is then deemed to be "first". The intervening validation process continues to check if the new "first" conflicts with its intervening elements. This search and check process proceeds until the "first" conflicts with its intervening elements, or until the commit element of the same transaction is reached finding no conflicts. If no conflicts are found between the "first" and its intervening elements, then the validation passes. The scheduler 17 sends a commit request message to an execution queue for the data manager 18 to perform write operations upon the validated transaction, otherwise the scheduler 17 sends out a restart request message.

If a conflict is found, per the pseudo-code of FIG. 3, let "second" be the commit element. The validation process then checks if "second" conflicts with its intervening elements in the same manner described above. The "second" element's intervening elements are the elements of other transactions between the "second" and the element of the same transaction before it. If both "first" and "second" conflict with their intervening elements, then validation fails. Otherwise, validation passes.

The intervening validation technique operates to swap adjacent elements if there is no conflict between them, since the resulting order is equivalent to the original order in terms of a serialization graph. A transaction validated by the intervening validation technique is eventually represented by only one equivalent element 19 in the RC-queue 20. By use of the intervening validation technique, a "read-commit" order concurrency control system and method of the present invention can be produced. The correctness of this method can be proven as follows:

Theorem: The read-commit concurrency control system and method produces serializable execution of transactions.

Proof: With the read-commit concurrency control system and method, the data manager 18 ensures that the disk access execution order is the same as RC order. The intervening validation technique guarantees that all validated transactions are represented by only one element 19 in the RC-queue 20. Thus, the element order in the RC-queue 20 is the equivalent serial transaction execution order.

With the intervening validation technique and the theorem of its correctness, three corollaries can be developed:

Corollary 1: A transaction does not need validation if it has only one element 19 in the RC-queue 20.

Corollary 2: A restart transaction does not need validation if it holds access invariance property.

Corollary 3: A transaction always passes validation if all of its intervening elements are read elements.

Corollary 1 is obvious, since there are no intervening elements if a transaction has only one element in the RC-queue, in which case validation is unnecessary. Corollary 2 is correct because data access requests can always be placed into one element for a restart transaction, if it holds access invariance property. With respect to corollary 3, the intervening elements only conflict with the commit element (deferred writes), thus, validation always passes (a validation failure needs the intervening elements conflicting with both the commit element and any read element of the transaction).

Read-Commit Order Concurrency Control—Centralized Database System

As stated earlier, within a centralized database system 10 it is presumed that clients 12 may access the database 14 locally or through the Internet. A transaction may send multiple data access request messages, each time containing one or more access operations. When a new request message arrives, a corresponding element 19 is generated. The element 19 is then posed to an RC-queue 20 maintained in the system 10. The data manager 18 executes operations from different transactions based on FCFS (first come first served) discipline, if they conflict with each other. Elements 19 in the RC-queue 20 are divided into the four previously-described types: read element, commit element, restart element, and validated element. When a commit message comes, a commit element is generated and the intervening validation process is invoked. If validation passes, the data manager 18 performs write operations for the validated transaction. Otherwise, the transaction is aborted or restarted.

The various procedures required to actually achieve the read-commit order concurrency control of the present invention can be split into three categories: 1. Client-side procedure; 2. Server-side scheduler procedure; and 3. Server-side data manager procedure. Each of the procedures is described below with reference to the pseudo-code listings of FIGS. 4, 5, and 6, respectively.

Client-Side Procedure

The client-side procedure, see FIG. 4, is initiated with a transaction that sends a message containing the read/write request from the client 12 to the database site, e.g., server 16. The client 12 waits for the values of the requested data items to be returned from the database site. If all requested data has been received and there are no further read/write operations to request, the client side procedure determines if the client 12 wants to abort or commit. If the client 12 wants to abort, an abort message is sent to the database site, the transaction ends, and all resources used by the transaction are released. If the client 12 wants to commit, it sends a commit request message to the database site. Once a commit request message has been sent, the client 12 waits for an acknowledgement message from the database site. If a success message is received from the database site, the transaction has committed and all the resources used by the transaction can be released. If no success message is received, i.e., the transaction has not committed, then it is presumed that values of reads received from the database site are from a restart message and, as such, the values for writes based on the newly received values are re-calculated. The client 12 then determines whether to restart the transaction or abort. If restarting the transaction, the client 12 sends a restart message with the new writes to the database site. If not restarting, the client 12 sends an abort message to the database site.

Server-Side Scheduler Procedure

In the server-side scheduler procedure, see FIG. 5, the scheduler 17 awaits messages from the client 12. If a database access request message arrives, the server-side scheduler 17 generates a read element, fills in the read element's fields with the information in the message, posts the read element to the RC-queue 20, and delivers the access request message to an execution queue. Note that the delivery order of the request messages must be the in same order as their corresponding read elements in the RC-queue.

If a commit request message arrives, the server-side scheduler 17 generates a commit element, posts it to the RC-queue 20, and invokes the intervening validation technique (described above). If the validation passes, the server-side scheduler 17 delivers the commit request message to the execution queue. If the validation does not pass, the server-side scheduler 17 removes all of the elements 19 of the transaction from the RC-queue 20 and assesses whether the transaction has the access invariance property. If the transaction does indeed have the access invariance property, the server-side scheduler 17 generates a restart element, posts the restart element to the RC-queue 20, delivers a restart request message to the server-side data manager 18, and sends a restart message with the new values of reads to the client 12 and awaits its answer. Note that the restart element contains the sets of all operations that the transaction requests, assuming the transaction access invariance property holds.

If a restart message with updates is received from the client 12, the server-side scheduler 17 operates to send the updates to the server-side data manager 18.

If a commit success message is received from the client 12, the server-side scheduler 17 transfers the success message to the client 12, marks the element 19 of the validated transaction in the RC-queue 20 as validated (i.e., set the validated V bit 30 to 1 (one)) if there is one or more uncommitted transactions before it in the RC-queue 20 or removes all elements 19 of committed transactions from the RC-queue 20 if there is no uncommitted transactions before it, and releases other resources used by the committed transaction.

If an abort message is received from the client 12, the server-side scheduler 17 removes all elements 19 of the transaction from the RC-queue 20 and releases all the resources used by the transaction.

Server-Side Data Manager Procedure

While there are operations to be performed, the server-side data manager 18 operates to retrieve messages from the execution queue, per the pseudo-code of FIG. 6. If the retrieved message is an access message, the server-side data manager 18 operates to set the read locks to the data items to read, performs the read operations, releases the read locks, and holds the write operations. If the access message requests data items that are write-locked, the server-side data manager 18 waits until the write-locks are released before setting the read locks.

If the retrieved message is a validation success message, the server-side data manager 18 operates to set the write locks on the data items to write, perform the write operations, release the write locks, send a commit success message to the server-side scheduler 17 after completing execution of each transaction and, finally, release all resources used by the committed transaction. If the data items are already locked, then the server-side data manager 18 waits for those locks to be released before locking them again for the present write operation.

The server-side data manager sets read-locks and write-locks before it performs operations to guarantee the execution order of conflicting operations from different transactions. A deadlock will not occur even though the data manager 18 uses locks. This is because all writes involved in a cycle will be invalidated, and the transaction will be aborted or restarted before the write operations intend to acquire a write-lock and execute. Moreover, unlike S2PL which releases locks only after the transaction commits, the read order concurrency control system and method of the present invention releases each read lock once the read operation completes. The blocking time caused by write-locks are negligible as well because the write-locks are acquired only after the transaction passes validation and are released immediately after the writes complete.

Operation of Read Order Concurrency Control

Figure 7:
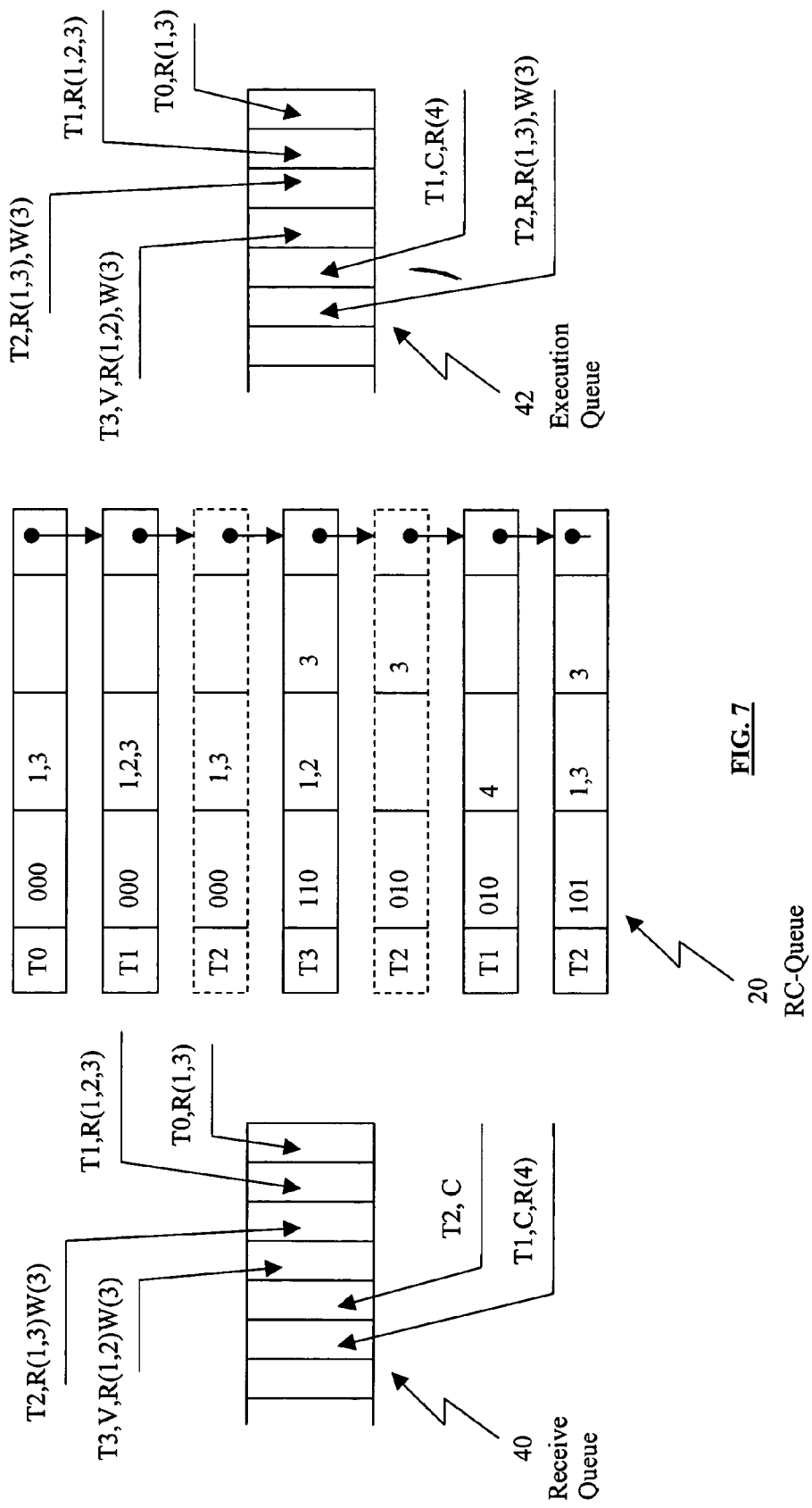
FIG. 7 is an example of the execution flow of the concurrency control system and method of the present invention.

With reference to FIG. 7, an example of how the read-commit order concurrency control system and method of the present invention functions is now described. As demonstrated in FIG. 7, suppose that there is a receive queue 40 that contains all of the request messages from clients 12. The first is an access request message 44 for transaction T0, which asks for read access of data items x1 and x3. Correspondingly, a read element is posed to the RC-queue 20 with Tid=0, V=0, C=0, R=0 and Readset ={1,3}. Then the message is delivered to an execution queue 42 for the data manager 18 to perform operations. The second message 46 in the receive queue 40 is T1 asking for read access of data items x1, x2 and x3. A corresponding read element is posed to the RC-queue 20 with Tid=1, V=0, C=0, R=0 and Readset={1,2,3}. The third message 48 is for T2 to read data items x1 and x3, and then write data item x3. The fifth message 52 is a commit request message from T2. Note that no writeset is placed in the read element (the third element). Instead, the writes of x3 are placed in the commit element (the fifth element) though the writes are still sent to the database sites for data log. This is because the data manager 18 delays the write operations to avoid cascading abort. The request message is then put to the execution queue 42 for execution. The data manager 18 executes the operations orderly based on the execution queue 42 if conflicts occur (this is enforced by the data manager 18).

The fourth message 50 is an access request message with a validated mark, which requests reads of data items x1, x2, and writes of x3. This means the client 12 is sure that the transaction only needs one request message. Correspondingly, the element representing T3 is marked as validated (V=1), since no validation is needed if the transaction has only one element in the RC-queue 20 (see Corollary 1, described above). When T2's commit request message comes after T3, its validation fails because it has two elements conflicting with an intervening element of the RC-queue 20—the element corresponding to T3. Thus, the elements (depicted as dashed elements on FIG. 7) are removed from the RC-queue 20 and a restart element is posed to the RC-queue 20. A corresponding restart request message is then put to the execution queue 42 to re-access the data items it requested before. Since the commit request message of T1 arrives during the validation of T2, and its commit element is posed before T2's restart element, the read-commit order concurrency control system and method of the present invention delivers T1's commit request message before T2's restart request message to the database sites, as can be seen in the execution queue 42. Note that even though transaction T3 committed, its element in the RC-queue 20 cannot be removed until it becomes the front of the queue, or all elements before it are marked as validated. This is because it may be involved in a cycle. As in the example, T2 and T3 forms a cycle of T2->T3->T2. If T3's validated element were removed from RC-queue 20 before T2's validation, the cycle would not be detected by T2's validation.

Figure 8:
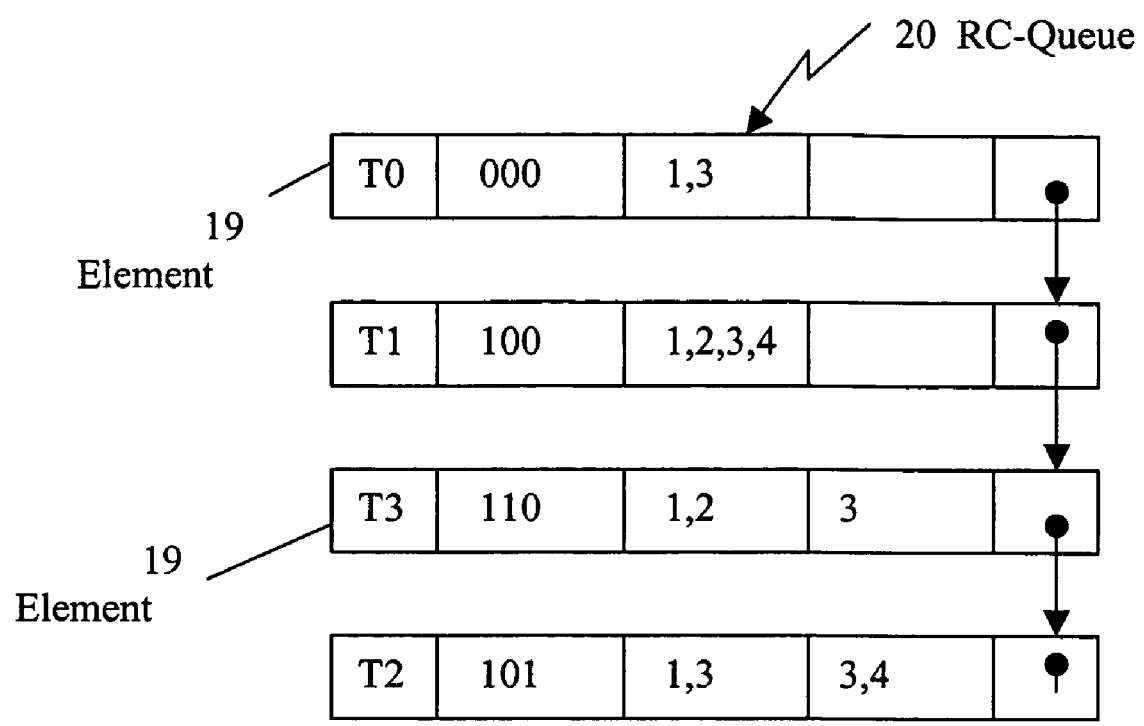
FIG. 8 depicts the RC-queue from FIG. 7 after transaction T1 has been validated.

After T2 fails in validation, T1's commit message activates the intervening validation process for T1. T1's "first" element 19 in the RC-queue 20 indicates that it reads x1, x2, and x3. Its intervening element is T3. "First" conflicts with its intervening element, since T3 writes x3 while T1 read x3 (a read-write conflict). The intervening validation process then checks if the "second", which in this instance is the commit element, conflicts with its intervening element. T3 is also the "second" element's intervening element in this example. The intervening validation process finds that no conflict exists between the "second" element and its intervening element T3. Thus, T1 passes validation. Note that if traditional optimistic concurrency control were used, it would fail T1 because of the read-write conflict on x3. The intervening validation technique of the read-commit order concurrency control system and method of the present invention merges the "second" with the "first" and marks it as validated. The resulting RC-queue 20 after the T1's validation is shown in FIG. 8, in which T1 is marked as validated (V=1), and T2 is marked as restarted and of access invariance property (R=1 and V=1).

The read-commit order concurrency control system and method of the present invention, and the intervening validation technique that it employs, provides various advantages to its users. The first of many is the RC-queue 20, a simplified version of the stored serialization graph (SSG), for transaction validation. The transaction validation of the read-commit order concurrency control only needs to check intervening conflicts when a commit request arrives. This feature helps to significantly reduce validation complexity and validation failures. Specifically, unlike the SSG method, the cycle search is very simple. The read-commit order concurrency control only needs to do intervening conflict checks during validation. The RC-queue 20 is easy to maintain, since only two pointer copy operations are needed when a new request message arrives. Further, unlike other optimistic concurrency control methods that restart transactions that conflict with committed transactions, the intervening validation technique only fails those transactions that have at least two elements conflicting with intervening elements of other transactions. The validations of those transactions that have only one element conflicting with other transactions always succeed. This helps to significantly reduce transaction restarts.

A static transaction may predeclare all of its data access operations in a single message. For such transactions that only submit one access request message, no validation is needed with the read-commit order concurrency control system and method of the present invention. The corresponding element of such a transaction in the RC-queue is always marked as validated. The example transaction is T3 described above. The "single message transaction that doesn't need validation" property of the read-commit order concurrency control system and method is also used for restarted transactions. Like static transactions, a restarted transaction does not need validation since it has only one element 19 in the RC-queue 20. The database system 10 will read the data items that the restart message requests, send back the values of reads and then wait for the values of writes. In this way, the system 10 guarantees the execution values of reads and then waits for the values of writes. In this way, the system guarantees that the execution of restarts succeeds. The feature is very attractive in real time systems—the guaranteed success of transaction re-execution makes the transaction response time more predictable, and, by making a transaction in urgent need of a successful execution as a fake restart transaction (overdeclare the data items it intends to access), it will succeed in its first execution without validation. A dynamic transaction can be converted to a static transaction via an over-declaring technique, described in "Request Order Linked List (ROLL): A Concurrency Control Object," The Proceedings of the IEEE International Conference of Data Engineering (Perrizo 1991) which is hereby incorporated by reference, and succeeds in its first execution phase. Thus, the read-commit order concurrency control system and method of the present invention provides a concurrency control method that makes transaction response time predictable and controllable, a desired feature in real time systems.

An interesting benefit provided by the intervening validation technique is that the deferred write technique introduces less probability of validation failures than with other optimistic concurrency control methods. By combining all writes of a transaction into one element, and using the element conflict concept in the intervening validation method, the chance of aborts due to conflicts with other transactions is significantly reduced.

The present invention's read-commit order concurrency control was compared with 2 PL, OCC and WDL (wait depth limit) in a client-server environment. The simulation results are provided in FIGS. 9A–9D. The parameter settings are as follows: 1. a client is assumed to send multiple access requests to the data server; 2. the average intratransaction think time is two seconds when considering the network delay and the interaction required between the client and the server; 3. the average inter-transaction time is zero, to form a closed system; 4. the database size is 1000 pages; 5. transaction size varies from 4 through 6 pages for low data contention environments, see FIGS. 9C and 9D, and 10 through 16 pages for high data contention environments, see FIGS. 9A and 9B; 6. disk I/O is 35 ms; 7. CPU processing time per page is 10 ms; and 8. the system has 10 CPUs and 20 disks in total.

The transaction throughput shown in FIGS. 9A and 9C is defined as the number of transactions completed per second. The restart number shown in FIGS. 9B and 9D is defined as the number of restarted transactions per thousand committed transactions. From the four figures, it can be seen that the read-commit order concurrency control system and method of the present invention has an advantage over 2PL, OCC, and WDL in terms of throughput and restarts.

It should be noted that, for the simplicity of discussion, the present invention was described above with the assumptions of transaction access invariance to guarantee the success of transaction re-execution. It can be removed easily by simply sending abort messages after validation failure, and treat a restarted transaction as if it were a newly arrived transaction. It is assumed that the new values of writes have to be calculated by the client when transaction validation fails, and thus, new values of reads have to be transferred to the client. This is a strict assumption. In many application cases, the new writes can be decided locally based on the new values of read, thus, transaction response is reduced further.

The present invention may be embodied in other specific forms without departing from the spirit of the essential attributes thereof, therefore, the illustrated embodiments should be considered in all respects as illustrative and not restrictive, reference being made to the appended claims rather than to the foregoing description to indicate the scope of the invention.

What is claimed:

1. A method for concurrency control in a computerized database system, said method comprising:
   receiving a database access request message from a transaction;
   generating an element to correspond to the access request message, wherein said element is selected from a group consisting of: a read element, a commit element, a validated element, and a restart element;
   posting said element to the bottom of a read-commit (RC) queue;
   invoking an intervening validation of said transaction upon the posting of said commit element to said RC-queue, wherein said intervening validation only checks the elements of the transaction to be validated and the intervening elements from previous other transactions in the RC-queue for validation, and wherein said intervening validation comprises:
      failing validation of said transaction upon said transaction having at least two elements that conflict with intervening elements of another transaction; and
      passing validation of said transaction upon having only at most one element that conflicts with intervening elements of another transaction; and
   performing the requested database access upon said transaction passing said intervening validation.

2. The method of claim 1, wherein said element is always posted to a bottom of said RC-queue.

3. The method of claim 1, wherein the requested database access is performed in the same order as the postings to said RC-queue.

4. The method of claim 1, wherein said intervening validation process ensures that a validated transaction is represented by only one element in said RC-queue.

5. A concurrency control system, comprising:
   a client, wherein said client produces a transaction having a database access request message;
   a server in communication with said client, said server having a scheduler and a data manager, wherein said scheduler:
      generates an element corresponding to said database access request message, said element selected from a group consisting of: a read element, a commit element, a validated element, and a restart element;
      posts said element to the bottom of a read-commit (RC) queue; and
      performs an intervening validation of said transaction when said element comprises said commit element, wherein said intervening validation only checks the elements of the transaction to be validated and the intervening elements from previous other transactions in the RC-queue for validation, wherein said intervening validation fails upon said transaction having at least two elements that conflict with intervening elements of another transaction, and wherein said intervening validation passes upon said transaction having only at most one element that conflicts with intervening elements of another transaction; and
   wherein said data manager performs the requested database access upon said transaction passing said intervening validation.

6. The system of claim 5, wherein the generated element is always posted to the bottom of said RC-queue.

7. The system of claim 5, wherein the requested database access is performed in the same order as the postings to said RC-queue.

8. The system of claim 5, wherein the performance of said intervening validation ensures that a validated transaction is represented by only one element in said RC-queue.

9. A system for concurrency control of a computerized database, comprising:
   transaction means for producing a transaction incorporating a database access request message; and
   data handling means for receiving said database access request message from said transaction means, for generating an element corresponding to said database access request message wherein said element selected from a group consisting of: a read element, a commit element, a validated element, and a restart element, for posting the corresponding element to the bottom of a read-commit (RC) queue, for performing an intervening validation of said transaction when said element comprises a commit element, and for performing the requested database access upon said commit element passing said intervening validation, wherein said intervening validation only checks the elements of the transaction to be validated and the intervening elements from previous other transactions in the RC-queue for validation, wherein said intervening validation fails upon said transaction having at least two elements that conflict with intervening elements of another transactions, and wherein said intervening validation passes upon said transaction having only at most one element that conflicts wit intervening elements of another transaction.

10. The system of claim 9, wherein the generated element is always posted to the bottom of the RC-queue.

11. The system of claim 9, wherein the requested database access is performed in the same order as the postings to said RC-queue.

12. The system of claim 9, wherein the performance of said intervening validation ensures that a validated transaction is represented by only one element.

* * * * *

UNITED STATES PATENT AND TRADEMARK OFFICE
CERTIFICATE OF CORRECTION

PATENT NO. : 7,051,028 B2 Page 1 of 1
APPLICATION NO. : 10/001193
DATED : May 23, 2006
INVENTOR(S) : Shi et al.

It is certified that error appears in the above-identified patent and that said Letters Patent is hereby corrected as shown below:

Page 3, On the Title Page Item -56-, line 9, please delete "Daojing" and insert --Baojing--.
Sheet 5 of 9, line 16, please delete "element" and insert --elements--.
Column 2, line 9, after "terms" please insert --of--.
Column 5, line 17, please delete "is".
Column 10, line 58, please delete space between "2" and "PL".
Column 11, line 4, please delete "the" and insert --The--.
Column 11, line 29, please delete "," and insert --;--.
Column 12, line 56, please delete "tions," and insert --tion,--.

Signed and Sealed this

Twenty Second Day of April, 2008

JON W. DUDAS
*Director of the United States Patent and Trademark Office*